United States Patent [19]
Yoshino

[11] Patent Number: 5,592,261
[45] Date of Patent: Jan. 7, 1997

[54] IMAGE FORMING APPARATUS HAVING A STEPPING MOTOR FOR ROTATING A PHOTOSENSITIVE DRUM

[75] Inventor: Satoshi Yoshino, Kawasaki, Japan

[73] Assignee: Fujitsu Limited, Kawasaki, Japan

[21] Appl. No.: 447,713

[22] Filed: May 23, 1995

[30]    Foreign Application Priority Data

Jul. 5, 1994  [JP]  Japan ..................................... 6-153887

[51] Int. Cl.$^6$ ................................................ G03G 21/00
[52] U.S. Cl. ........................................... 399/167; 318/696
[58] Field of Search .................................... 355/200, 211, 355/326, 327; 318/685, 696

[56]    References Cited

U.S. PATENT DOCUMENTS

| | | | |
|---|---|---|---|
| 4,295,083 | 10/1981 | Leenhouts | 318/696 |
| 4,477,756 | 10/1984 | Moriguchi | 318/696 |
| 4,903,067 | 2/1990 | Murayama et al. | 347/129 |
| 5,111,242 | 5/1992 | Tanimoto et al. | 355/200 |

FOREIGN PATENT DOCUMENTS

| | | |
|---|---|---|
| 57-186267 | 11/1982 | Japan . |
| 63-13167 | 1/1988 | Japan . |
| 64-2470 | 1/1989 | Japan . |

*Primary Examiner*—Arthur T. Grimley
*Assistant Examiner*—Quana Grainger
*Attorney, Agent, or Firm*—Staas & Halsey

[57]    ABSTRACT

An image forming apparatus for developing an electrostatic latent image formed on a photosensitive drum by a toner while rotating the photosensitive drum, transferring the toner image to a paper, and fixing the toner image on the paper. The photosensitive drum is rotated by a stepping motor, and an excitation circuit gradually increases an exciting current of a coil in each phase of the stepping motor to a predetermined value and thereafter gradually decreases. By this control of the exciting current, the stepping motor smoothly rotates without generating minute vibration, so that when the photosensitive drum is rotated by the stepping motor, there is no deleterious influence on an image. Use of the stepping motor enables a reduction in the size and the cost of the image forming apparatus.

2 Claims, 11 Drawing Sheets

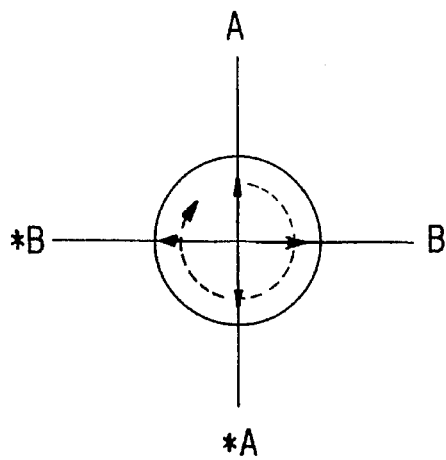
FIG. 9A (PRIOR ART)
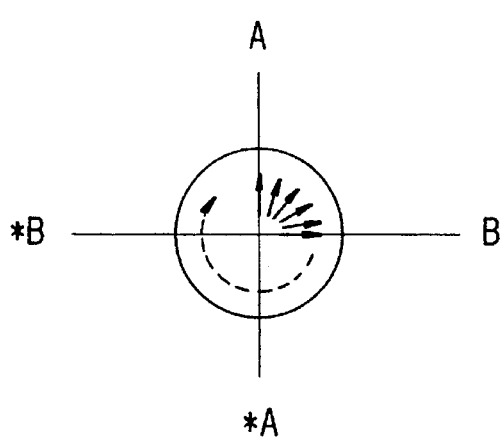
FIG. 9B (INVENTION)
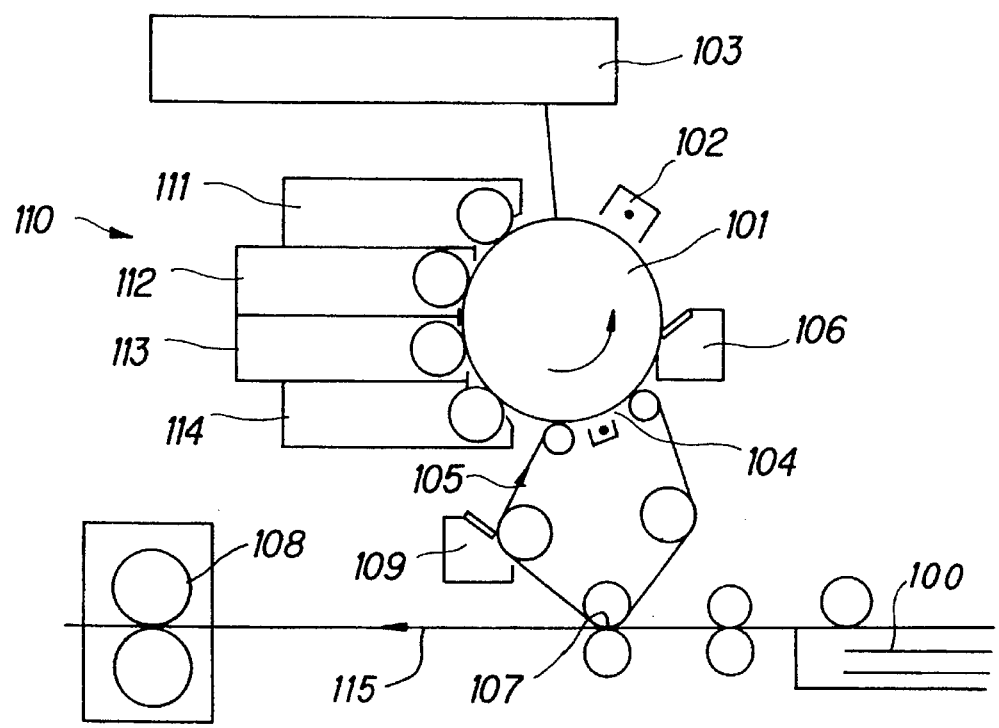
FIG. 10

IMAGE FORMING APPARATUS HAVING A STEPPING MOTOR FOR ROTATING A PHOTOSENSITIVE DRUM

BACKGROUND OF THE INVENTION

The present invention relates to an image forming apparatus for developing an electrostatic latent image formed on a photosensitive drum by a toner while rotating the photosensitive drum, transferring the toner image to paper, and fixing the toner image on the paper and, more particularly, to an image forming apparatus for forming an image by smoothly rotating a photosensitive drum by a stepping motor.

As a driving system for driving a stepping motor, there are a one-phase excitation system, a one-two phase excitation system and a two-phase excitation system. For example, in a two-phase excitation system for a stepping motor provided with four-phase exciting coils (phase A, phase *A, phase B, phase *B), (1) excitation of the phases A and B, (2) excitation of the phases B and *A, (3) excitation of the phases *A and *B, (4) excitation of the phases *B and A are repeated in series, thereby rotating the rotor of a step motor at an electrical angle of 90 degrees per excitation, as shown in FIG. 11. In FIG. 11, the symbols SA, SB, *SA, *SB represent the driving signals in the phases A, B, *A and *B, respectively.

FIG. 12 shows the structure of an excitation circuit for driving a stepping motor by a two-phase excitation system. In FIG. 12, the reference numeral 1 represents a stepping motor, 1a a coil in the phase A, 1b a coil in the phase *A, 1c a coil in the phase B, and 1d a coil in the phase *B. The reference numeral 2 represents an excitation circuit for the phases A and *A and 3 an excitation circuit for the phases B and *B. The excitation circuits 2 and 3 have the same structure. The reference numeral 4 denotes a reference voltage generator, which divides a constant terminal voltage of a Zener diode 4a by a variable resistor 4b and a fixed resistor 4c and inputs a reference voltage $V_{REF}$ which corresponds to a reference current (constant) into each of the excitation circuits 2, 3.

In the excitation circuit 2, the reference numerals 2a, 2b denote switching transistors (which may be FET, etc.) connected in series to the coils 1a, 1b in the phases A and *A, 2c a detector resistor for detecting the exciting currents $I_A$, *$I_A$ which flow on the coils 1a, 1b when the corresponding switching transistors 2a, 2b are in "on" state, and 2d, 2e diodes for causing flyback currents $I_{FA}$, *$I_{FA}$ to flow on the coils 1a, 1c when the corresponding switching transistors 2a, 2b are turned off. The reference numeral 2f represents a comparator for comparing a detected current value (the terminal voltage $V_D$ of the detector resistor 2c) with the reference current value (reference voltage $V_{REF}$), and generating a pulse Sc when $V_D \geq V_{REF}$, 2g a one-shot multivibrator for outputting a signal Sd which is held at a low level for a predetermined time when the pulse Sc is output from the comparator 2f and which is elevated to a high level thereafter, 2h an AND gate for passing the output Sd of the one-shot multivibrator 2g therethrough when an A-phase driving signal SA is input, and 2i an AND gate for passing the output Sd of the one-shot multivibrator 2g therethrough when an *A-phase driving signal *SA is input. The excitation circuit 3 has the same structure as the excitation circuit 2, but it excites the coils 1c and 1d in the phases B and *B, respectively.

FIG. 13 shows the waveform of a signal in each portion of the excitation circuit 2 for exciting the coil 1a in the phase A. Since the one-shot multivibrator 2g ordinarily outputs a signal Sd of a high level, the AND gate 2h outputs a switching signal Se of a high level when the driving signal SA is elevated to a high level. The transistor 2a is then turned on, and the A-phase exciting current $I_A$ flows on the coil 1a in the phase A and the voltage $V_D$ which corresponds to the exciting current value is input to the comparator 2f. The comparator 2f compares the reference voltage $V_{REF}$ with the detected voltage $V_D$, and generates a pulse Sc when $V_D$ becomes not less than $V_{REF}$. When the pulse Sc is generated, the output signal Sd of the multivibrator 2g is reduced to a low level for a predetermined time Tm. As a result, the switching transistor 2a is turned off, and the exciting current $I_A$ becomes zero. When the switching transistor 2a is turned off, the energy stored in the coil 1a in the phase A flows in the diode 2d as the flyback current $I_{FA}$.

When the predetermined time Tm elapses, since the output signal Sd of the multivibrator 2g is raised to a high level again, the switching transistor 2a is turned on, and the exciting current $I_A$ begins to flow again. This operation is repeated during the time in which the phase A driving signal SA is held at a high level, and the exciting current $I_{AA}(=I_A+I_{FA})$ flows on the coil 1a in the phase A in total. The exciting current $I_{AA}$ has a substantially rectangular shape.

In this manner, substantially rectangular exciting currents $I_{AA}$, *$I_{AA}$, $I_{BB}$, *$I_{BB}$ flow on the respective coils while the driving signals SA, *SA, SB, *SB are at high levels, thereby sequentially rotating the stepping motor.

In the above-described stepping motor driving system, however, since the stepping motor is rotated at 90 degrees each time, the rotation is step-wise, so that minute vibration generates. When a stepping motor is used as a driving source of a photosensitive drum of an image forming apparatus such as an electrophotographic printer and a copying machine, the minute vibration deteriorates an image. For this reason, a stepping motor is not used as the driving source of a photosensitive drum of an image forming apparatus, and a DC motor or a brushless DC motor is used instead. However, it is now necessary to drive a photosensitive drum by a stepping motor in response to the recent demand for an inexpensive, small-sized high-speed image forming apparatus having a long life.

Especially, in color printers, a photosensitive drum for a black color and three photosensitive drums for the three primary colors are necessary. In addition, since it is required in color printing to sequentially change toners so as to correctly superimpose different colors, it is necessary to rotate the photosensitive drums with high accuracy. It is also necessary to drive the belt with high accuracy so as to feed paper to the toner transferring position of each photosensitive drum. In this way, in color printers, it is necessary to drive a photosensitive drum and a belt by a small-sized motor which is produced at a low cost and which enables high-speed and highly accurate driving. To meet such demand, it is necessary to drive a photosensitive drum by a stepping motor.

SUMMARY OF THE INVENTION

Accordingly, it is an object of the present invention to provide an image forming apparatus and a colored image forming apparatus in which a stepping motor which rotates smoothly drives a photosensitive drum, paper-feeding belt and an intermediate transfer medium.

It is another object of the present invention to provide an image forming apparatus and a colored image forming apparatus in which a small-sized stepping motor which is produced at a low cost, which enables high-speed and highly accurate driving and which has a long life drives a photosensitive drum, paper-feeding belt, an intermediate medium, etc.

It is still another object of the present invention to provide an image forming apparatus and a colored image forming apparatus in which a stepping motor smoothly rotates due to an exciting current having a shape of a sine wave or a triangular wave.

To achieve these ends, in a first aspect of the present invention, there is provided an image forming apparatus for developing an electrostatic latent image formed on a photosensitive drum by a toner while rotating the photosensitive drum, transferring the toner image to a paper, and fixing the toner image on the paper, the apparatus comprising: a stepping motor for rotating the photosensitive drum; and an excitation circuit for gradually increasing an exciting current of a coil in each phase of the stepping motor to a predetermined value and thereafter gradually decreasing the exciting current in the shape of, for example, a sine wave and a triangular wave.

In a second aspect of the present invention, there is provided a colored image forming apparatus comprising:

a photosensitive drum for a black color; three photosensitive drums for three primary colors; a belt for sequentially feeding paper to the transfer position of each of the photosensitive drums; stepping motors for rotating the photosensitive drums and the belt, respectively; and an excitation circuit for gradually increasing an exciting current of a coil in each phase of each stepping motor to a predetermined value and thereafter gradually decreasing the exciting current in the shape of, for example, a sine wave and a triangular wave.

In a third aspect of the present invention, there is provided an image forming apparatus for developing an electrostatic latent image formed on a photosensitive drum by a toner while rotating the photosensitive drum, transferring the toner image to an intermediate transfer medium, transferring the toner image on the intermediate transfer medium to a paper, and fixing the toner image on the paper, the apparatus comprising: a stepping motor for rotating the intermediate transfer medium; and an excitation circuit for gradually increasing an exciting current of a coil in each phase of the stepping motor to a predetermined value and thereafter gradually decreasing the exciting current.

Other features and advantages of the present invention will be apparent from the following description taken in conjunction with the accompanying drawings.

BRIEF DESCRIPTION OF THE DRAWINGS

FIGS. 9A and 9B are explanatory views of the rotation of a stepping motor in the present invention;

FIG. 10 shows the structure of an electrophotographic printer using an intermediate transfer medium;

DESCRIPTION OF THE PREFERRED EMBODIMENTS (a) Scheme of the Invention

Figure 1:
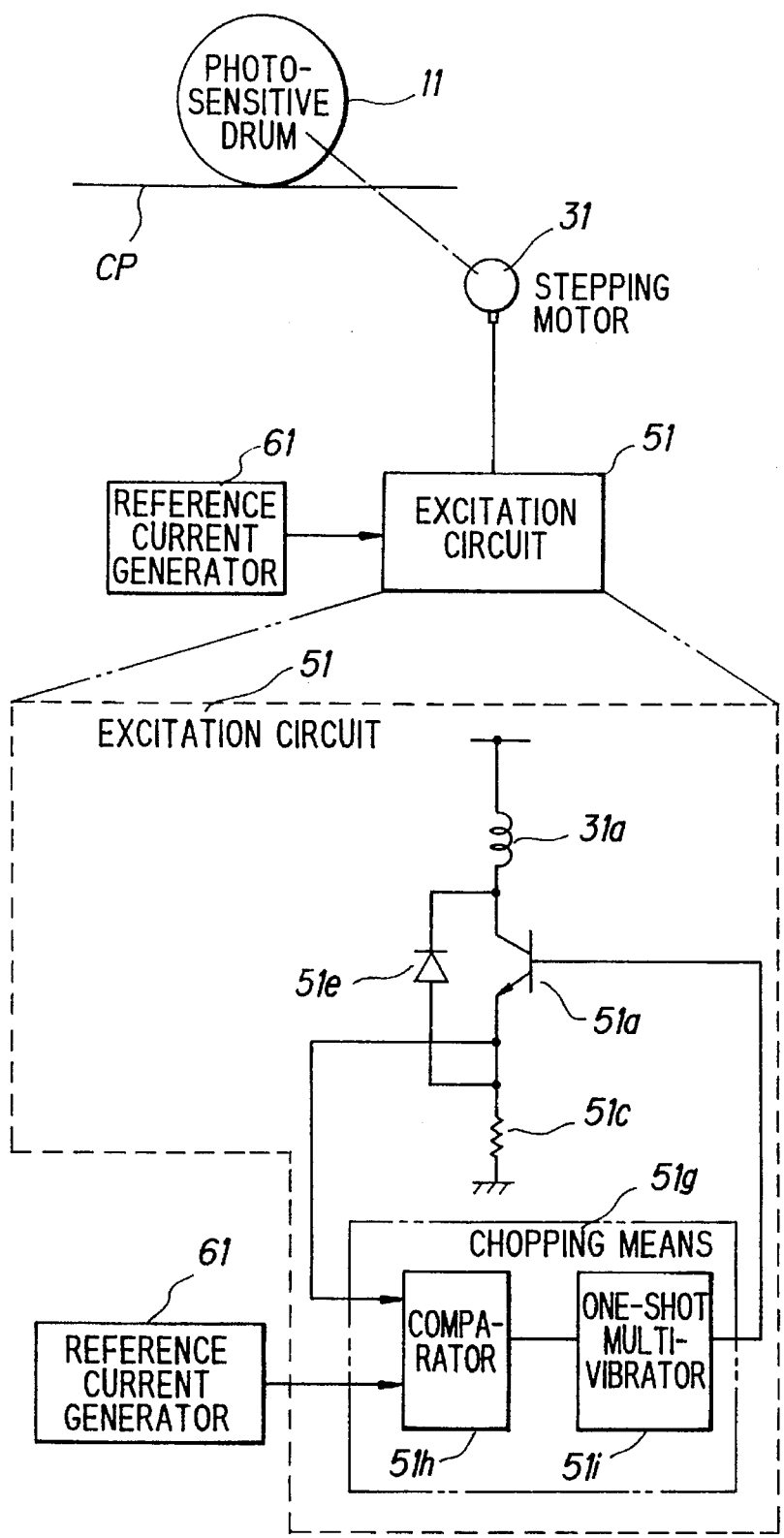
FIG. 1 is an explanatory view of the principle of the present invention.

FIG. 1 is a schematic explanatory view of the present invention.

The reference numeral 11 represents a photosensitive drum, 31 a stepping motor for rotating the photosensitive drum 11, 51 an excitation circuit for gradually increasing an exciting current of a coil in each phase of the stepping motor 31 to a predetermined value and thereafter gradually decreasing the exciting current, and 61 a reference current generator for generating a reference current waveform in each phase which gradually increases to a predetermined value and thereafter gradually decreases. In the excitation circuit 51, the reference numeral 51a represents a switching transistor provided in correspondence with a coil 31a in a phase A, 51c a detecting portion (detection resistor) for detecting an exciting current which flows on the coil when the switching transistor 51a is in "on" state, 51e a diode for causing a flyback current to flow on the coil 31a in the phase A when the switching transistor 51a is turned off, and 51g a chopping means provided with a comparator 51h for comparing a detected current value with a reference current value in each phase and a one-shot multivibrator 51i for turning off the corresponding switching transistor 51a for a predetermined time when the detected current value reaches the reference current value and thereafter turning on the switching transistor 51a.

The image forming apparatus shown in FIG. 1 develops an electrostatic latent image formed on the photosensitive drum 11 by a toner while rotating the photosensitive drum 11, transfers the toner image to a paper, and fixes the toner image on the paper. The photosensitive drum 11 is rotated by the stepping motor 31, and the excitation circuit 51 so controls the exciting current in the coil 31a in each phase of the stepping motor 31 as to gradually increase to a predetermined value and thereafter gradually decrease. Since the exciting current is so controlled as to gradually increase and thereafter gradually decrease in this manner, the stepping motor rotates smoothly without producing minute vibration, so that no bad influence is exerted on an image when the photosensitive drum is driven by the stepping motor. Use of the stepping motor enables a reduction in the size and the cost of an image forming apparatus, and is capable of prolonging the life of an image forming apparatus. Especially in a color printer which is provided with a photosensitive drum for a black color, three photosensitive drums for the three primary colors and a belt for feeding paper to the transferring position of each photosensitive drum, if stepping motors are used for driving the photosensitive drums and the belt, respectively, the size and cost reducing effect is further enhanced.

The excitation circuit 51 is composed of the switching transistor 51a provided in correspondence with the coil 31a in each phase, the detecting portion 51c for detecting an exciting current which flows on the coil when the switching transistor 51a is in "on" state, the chopping means 51g for turning off the corresponding switching transistor for a predetermined time when the detected current value reaches the reference current in a phase, and the diode 51e for causing a flyback current to flow in the corresponding coil 31a when the switching transistor 51a is turned off. If the reference current has a sine or triangular waveform, the exciting current which flows on the coil 31a in each phase gradually increases or decreases in accordance with a sine or triangular waveform, so it is possible to rotate the stepping motor 31 smoothly without producing minute vibration.

(b) Entire structure of a color printer

Figure 2:
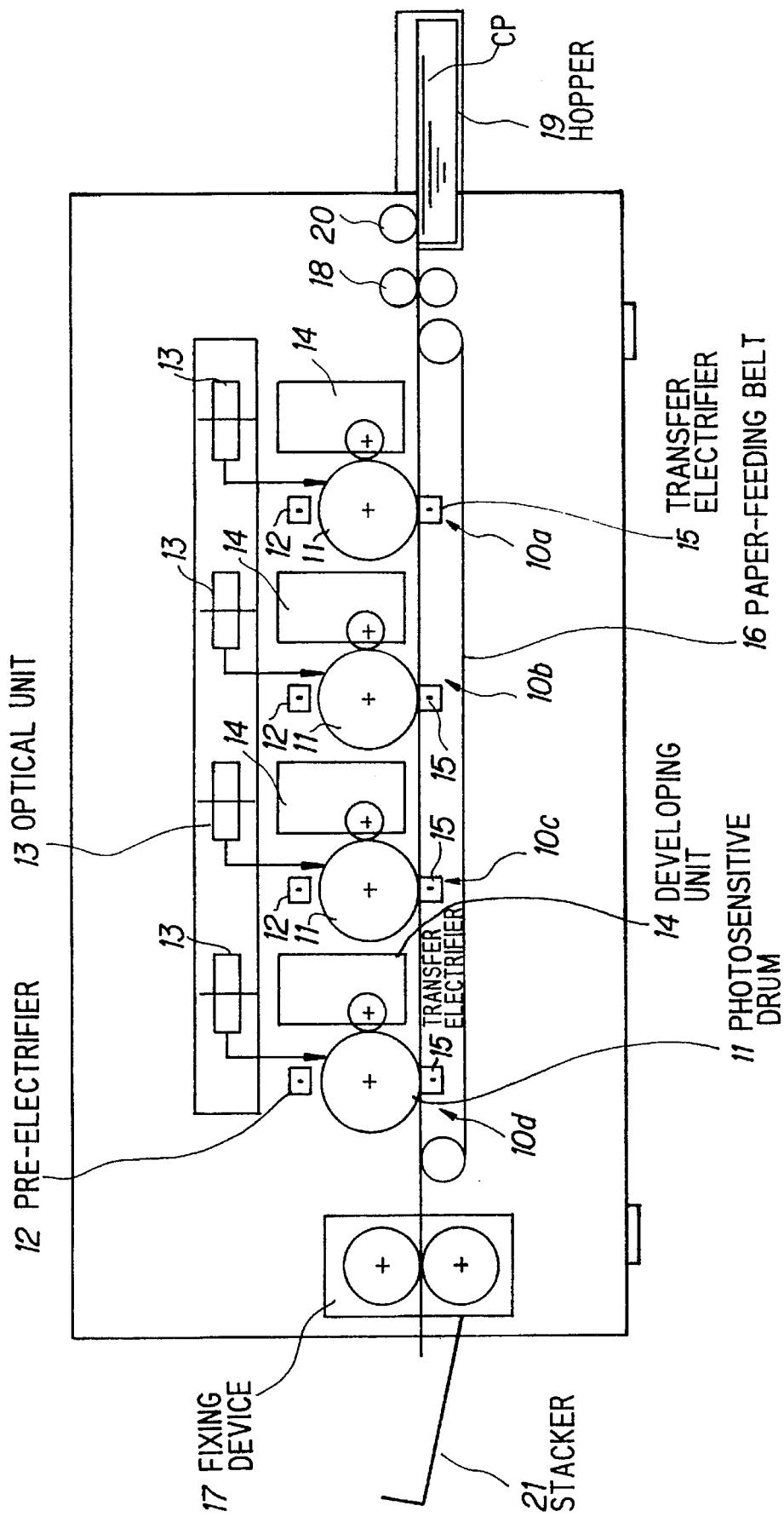
FIG. 2 shows the entire structure of a color printer.

FIG. 2 shows the entire structure of a color printer. In FIG. 2, the reference numeral 10a represents a first image forming portion for black-color printing, and 10b to 10d second to fourth image forming portions for printing the three primary colors (red, blue, green). Each image forming portion has the same structure, wherein the reference numeral 11 represents a photosensitive drum, 12 a pre-electrifier, 13 an optical unit, 14 a developing unit and 15 a transfer electrifier.

The reference numeral 16 represents a paper-feeding belt for sequentially feeding paper to the transferring position of each photosensitive drum 11 of each of the image forming portions 10a to 10d, 17 a fixing device for fixing a toner image by thermo-compression rollers or a flush lamp, 18 paper feed rollers, 19 a hopper for accommodating multiple sheets of cut paper CP, 20 a pick-up roller for picking each sheet up and supplying it from the hopper 20, and 21 a stacker.

The photosensitive drum 11 of each of the image forming portions 10a to 10d and the belt 16 are driven by stepping motors (not shown) each of which is rotated in micro angular steps.

Each paper CP is picked up from the hopper 19 by the pick-up roller 20 and supplied to the transferring portion (transfer electrifier) 15 of the first image forming portion 10a by the paper-feeding belt 16. A black toner image on the photosensitive drum 11 is transferred to the paper CP by the transferring portion 15, thereby finishing black printing. The paper CP is then sequentially carried to the transferring portions 15 of the second to fourth image forming portions 10b to 10d by the paper-feeding belt 16. The toner images on the respective photosensitive drums 11 are transferred to the paper CP in accordance with desired colors, thereby finishing desired color printing. Finally, the paper CP is carried to the fixing device 17, which fixes the unfixed toner image. The timing for beginning or ending the projection of an optical image by the optical unit 13 or timing for beginning or ending the corona discharge by the transfer electrifier 15 is controlled on the basis of the time at which the paper CP is detected by a paper sensor (not shown) so as to enable correct printing on the paper CP.

(c) Image forming portion

Figure 3:
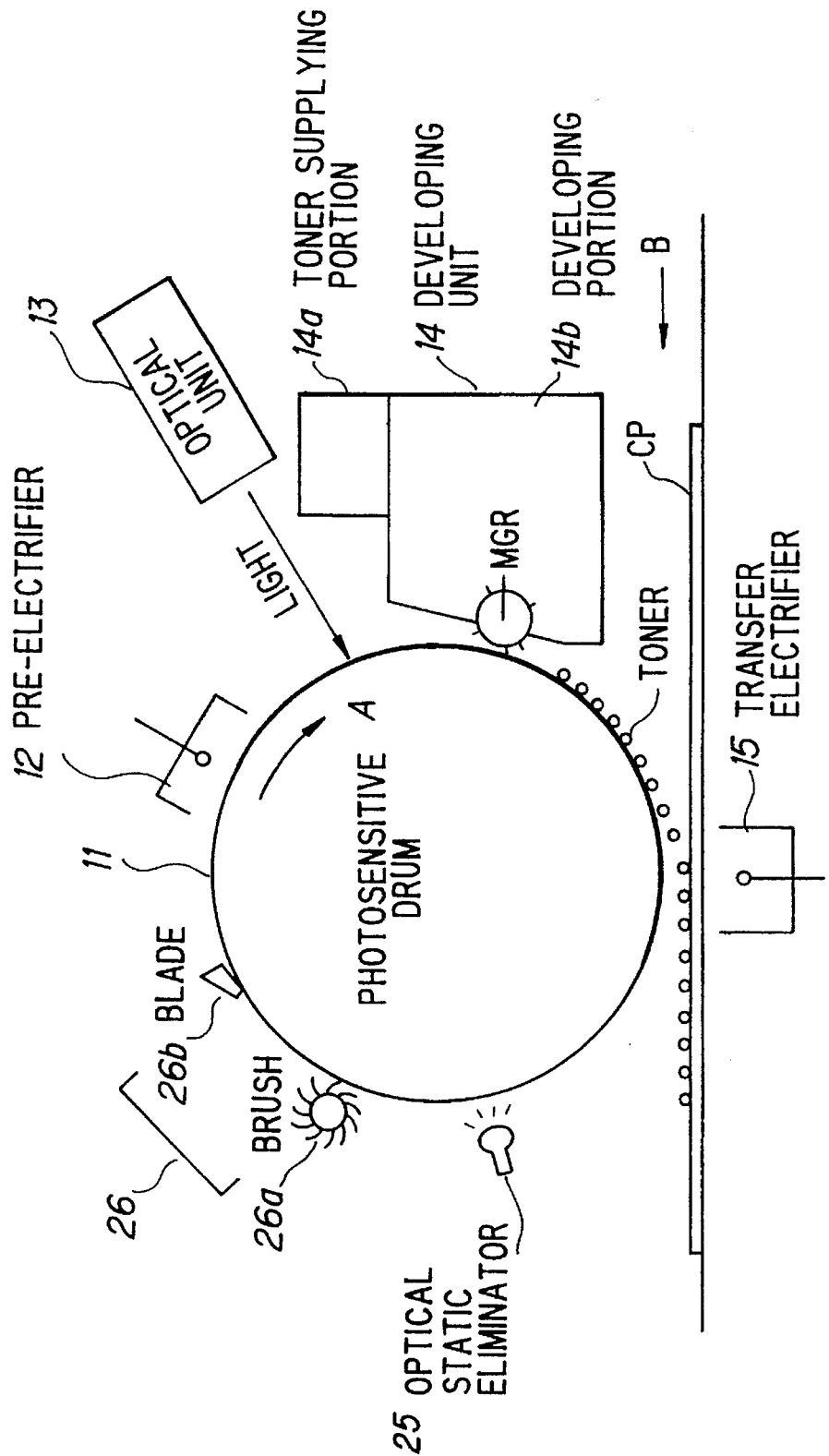
FIG. 3 shows the structure of the image forming portion of the color printer shown in FIG. 2.

FIG. 3 shows the structure of each of the image forming portions 10a to 10d in the color printer shown in FIG. 2. The reference numeral 11 represents a photosensitive drum having a photoconductive material (photosensitive material) on the surface thereof. The photosensitive drum 11 rotates at a constant rate in the direction indicated by the arrow A. The reference numeral 12 denotes a pre-electrifier for uniformly electrifying the surface of the photosensitive drum, 13 an optical exposure unit for projecting an optical image onto the photosensitive drum 11 so as to form an electrostatic latent image, and 14 a developing unit for forming a toner image which corresponds to the electrostatic latent image. The developing unit 14 is provided with a toner supplying portion 14a and a developing portion 14b. The reference numeral 15 represents a transfer electrifier for transferring the toner image to paper CP, 25 an optical static eliminator for eliminating the charges on the photosensitive drum 11 by projecting light, and 26 a cleaner for removing and cleaning the toner remaining on the photosensitive drum 11, The cleaner 26 is provided with a brush 26a and a blade 26b.

The paper CP is taken out of the hopper 19 (FIG. 2) on the right-hand side one sheet at a time, carried in the direction indicated by the arrow B, and discharged into the stacker 21 (FIG. 2) on the left-hand side via the transfer electrifier 15 of each image forming portion and the fixing portion 17 (FIG. 2).

When an optical image is projected onto the surface of the photosensitive drum 11 which is uniformly positively electrified by the pre-electrifier 12, the charges at the portion to which light is projected are removed, thereby forming an electrostatic latent image. When the developing unit 14 rotates a magnet roll (developing roll) MGR biased at a predetermined developing voltage so as to rub a positively electrified toner on the surface of the photosensitive drum 11, the toner moves onto the electrostatic latent image, thereby forming a toner image. By the subsequent corona discharge from the back surface of the paper CP by the transfer electrifier 15 at a potential of the opposite polarity (negative) to the potential for electrifying the toner image, the toner image is transferred to the paper CP. The paper CP to which the toner image is transferred by the transfer electrifier 15 is then fed to the fixing device 17 (FIG. 2), which fixes the unfixed toner image, and the paper CP is discharged into the stacker 21. After the toner image is transferred to the paper CP, the photosensitive drum 11 is further rotated, the charges on the photosensitive drum 11 are eliminated by the optical static eliminator 25, and the remaining toner is removed by the cleaner 26. Thus, the photosensitive drum 11 is made ready for the formation of the next electrostatic latent image.

(d) Optical unit

Figure 4:
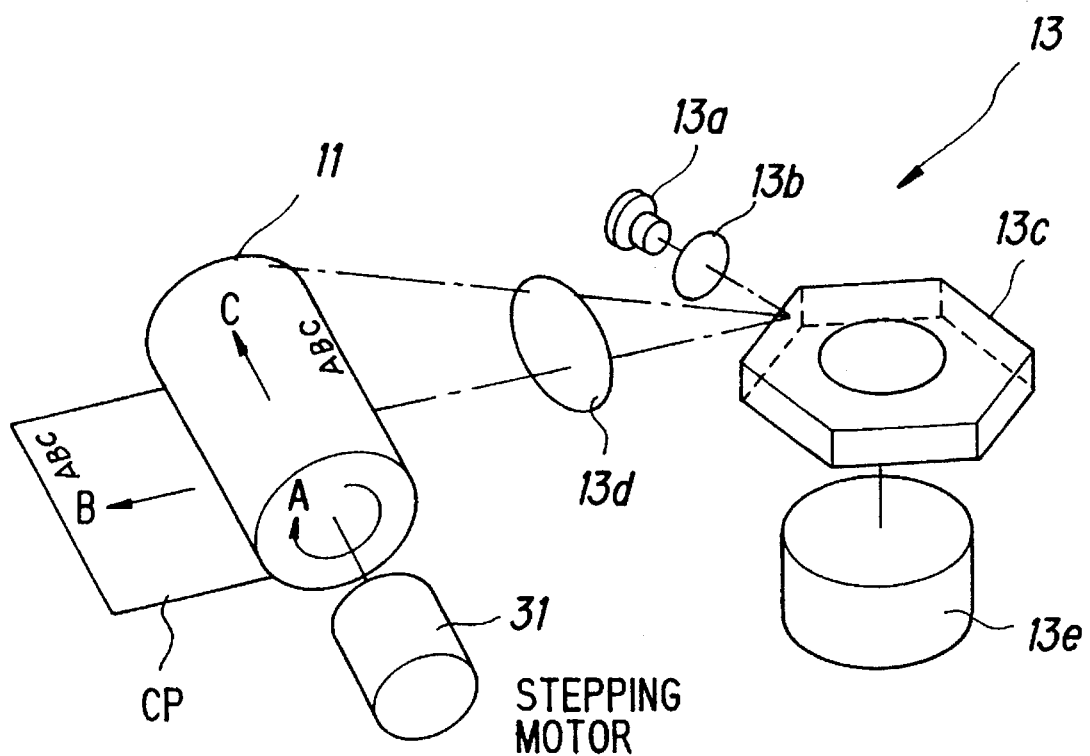
FIG. 4 shows the structure of an optical unit.

FIG. 4 shows the structure of the optical exposure unit 13. In FIG. 4, the reference numeral 11 denotes a photosensitive drum and 31 a stepping motor driven in micro angular steps so as to rotate the photosensitive drum 11.

In the optical unit 13, the reference numeral 13a denotes a laser diode, 13b a collimator lens, 13c a polygon mirror for scanning laser light in the longitudinal direction (indicated by the arrow C) of the photosensitive drum 11, 13d an F-θ lens (image formation lens), and 13e a spindle motor for rotating the polygon mirror 13c at a constant rate.

The laser diode 13a is turned on/off so as to turn on/off laser light in accordance with dot-image printing information. The laser light which is turned on/off in accordance with the printing information reaches the polygon mirror 13c via the collimator lens 13b. Since the polygon mirror 13c is rotated at a constant rate by the spindle motor 13e, the laser light which has entered the polygon mirror 13c is repeatedly moved in the longitudinal direction (indicated by the arrow C) of the photosensitive drum 11 via the F-θ lens 13d. If the photosensitive drum 11 is rotated in the direction indicated by the arrow A and the laser light turned on/off in accordance with the printing information is scanned in the longitudinal direction of the photosensitive drum 11, the optical dot image is projected and the electrostatic latent image of the dot image is formed on the surface of the photosensitive drum 11.

(e) Driving the stepping motor in micro angular steps

As described above, the photosensitive drum 11 of each of the image forming portions 10a to 10d and the belt 16 are rotated by stepping motors each of which is driving in micro angular steps. By this driving, each stepping motor is smoothly rotated without producing minute vibration.

Figure 5:
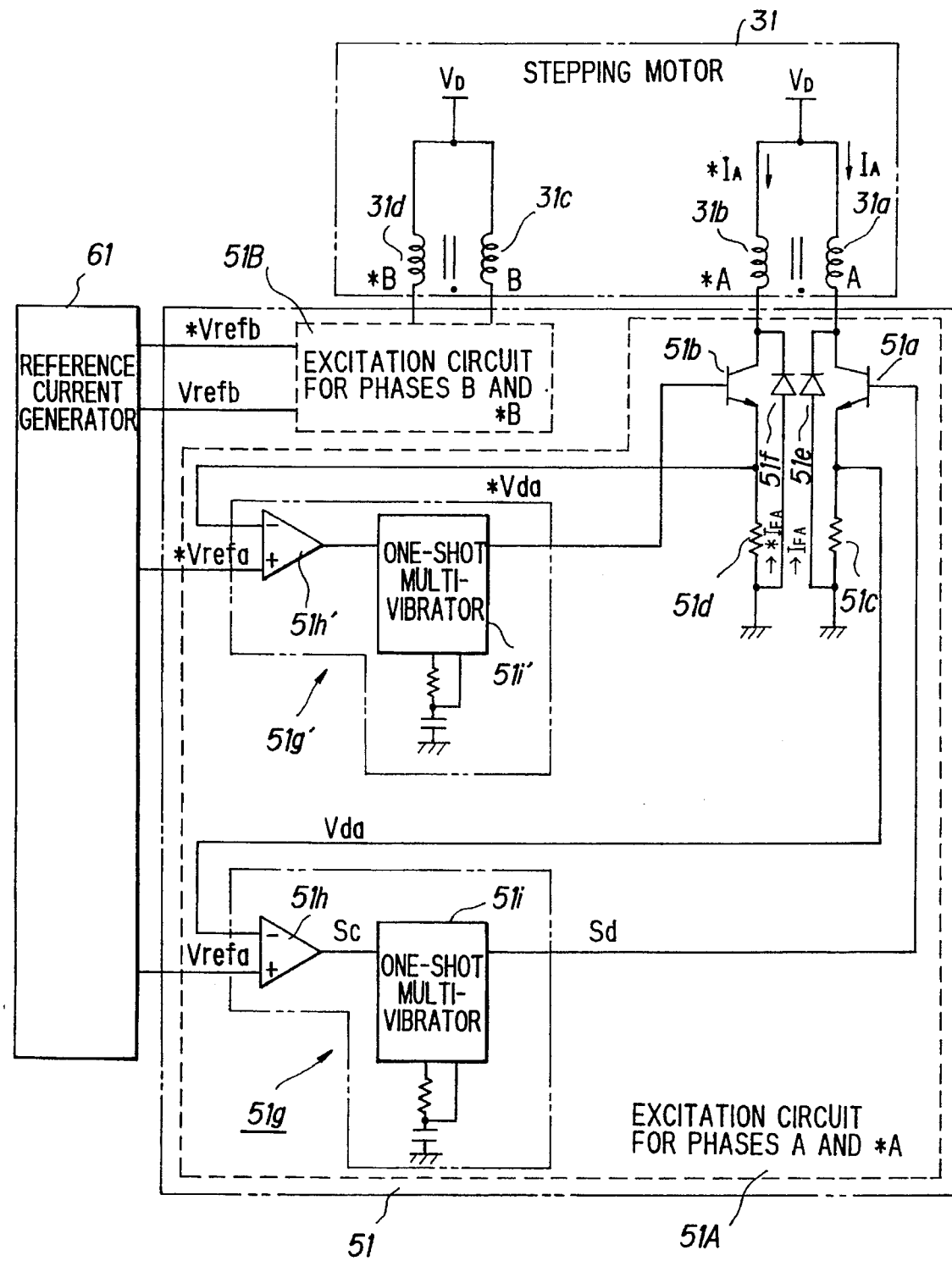
FIG. 5 shows the structure of an excitation circuit in the present invention.

FIG. 5 shows the structure of an excitation circuit for driving a stepping motor in micro angular steps in the present invention. In FIG. 5, the reference numeral 31 represents a stepping motor, 51 an excitation circuit for gradually increasing an exciting current of a coil in each phase of the stepping motor 31 to a predetermined value and thereafter gradually decreasing the exciting current, and 61 a reference current generator for generating a reference current waveform in each phase which gradually increases to a predetermined value and thereafter gradually decreases.

Figure 6A:
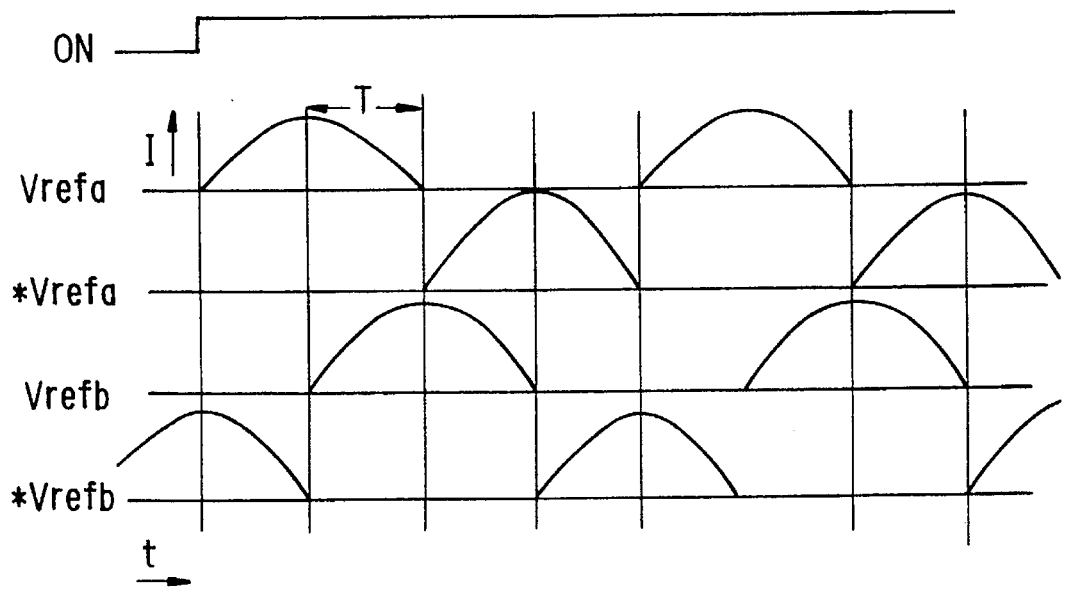
FIGS. 6A and 6B show the waveform of the reference current in each phase in the present invention.
Figure 6B:
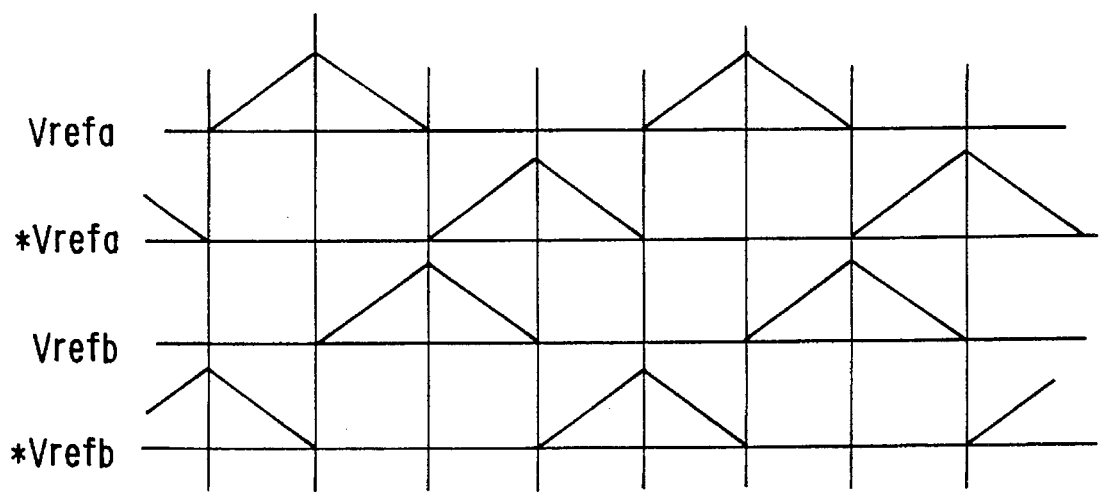

The reference current generator 61 generates a reference current having a sine waveform, as shown in FIG. 6A or a triangular waveform, as shown in FIG. 6B. The reference current waveform *Vrefa of a phase *A is produced by delaying the phase of the reference current waveform Vrefa of a phase A by 180 degrees. The reference current waveform Vrefb of a phase B is produced by delaying the phase of the reference current waveform Vrefa of the phase A by 90 degrees. The reference current waveform *Vrefb of a phase *B is produced by delaying the phase of the reference current waveform Vrefb of the phase B by 180 degrees. In other words, the reference current waveform Vrefa of the phase A, the reference current waveform Vrefb of the phase B, the reference current waveform *Vrefa of the phase *A, and the reference current waveform *Vrefb of the phase *B, are produced repeatedly with a phase difference of 90 degrees.

Returning to FIG. 5, in the stepping motor 31, the reference numerals 31a to 31d represent coils in the phases A, *A, B and *B, respectively. In the excitation circuit 51, the reference numeral 51A represents an excitation circuit for exciting the coil 31a in the phase A and the coil 31b in the phase *A, 51B an excitation circuit for exciting the coil 31c in the phase B and the coil 31d in the phase *B. The excitation circuits 51A and 51B have the same structure. FIG. 5. shows only the excitation circuits 51A.

In the excitation circuit 51A, the reference numeral 51a denotes a switching transistor provided in correspondence with the coil 31a in the phase A, 51b a switching transistor provided in correspondence with the coil 31b in the phase *A, 51c a detecting portion (detector resistor) for detecting the exciting currents which flows on the coil 31a in the phase A when the switching transistor 51a is in the "on" state, and 51d a detecting portion (detector resistor) for detecting the exciting current which flows on the coil 31b in the phase *A when the switching transistor 51b is in the "on" state. The reference numeral 51e denotes a diode for causing a flyback current to flow on the coil 31a when the switching transistors 51a is turned off, and 51g a diode for causing a flyback current to flow on the coil 31b when the switching transistors 51b is turned off.

The reference numeral 51g represents a chopping means for the phase A. The chopping means 51g is provided with a comparator 51h for comparing a detected current value (the terminal voltage Vda of the detector resistor 51c) in the phase A with the reference current value (reference voltage Vrefa (see FIG. 6A or 6B)), and a one-shot multivibrator 51i for turning off the corresponding switching transistor 51a for a predetermined time when the detected current value in the phase A reaches the reference current, and thereafter turning on the switching transistor 51a. The reference numeral 51g' represents a chopping means for the phase *A. The chopping means 51g' is provided with a comparator 51h' for comparing a detected current value (the terminal voltage *Vda of the detector resistor 51d) in the phase *A with the reference current value (reference voltage *Vrefa (see FIG. 6A or 6B), and a one-shot multivibrator 51i' for turning off the corresponding switching transistor 51b for a predetermined time when the detected current value in the phase *A reaches the reference current, and thereafter turning on the switching transistor 51b.

Figure 7:
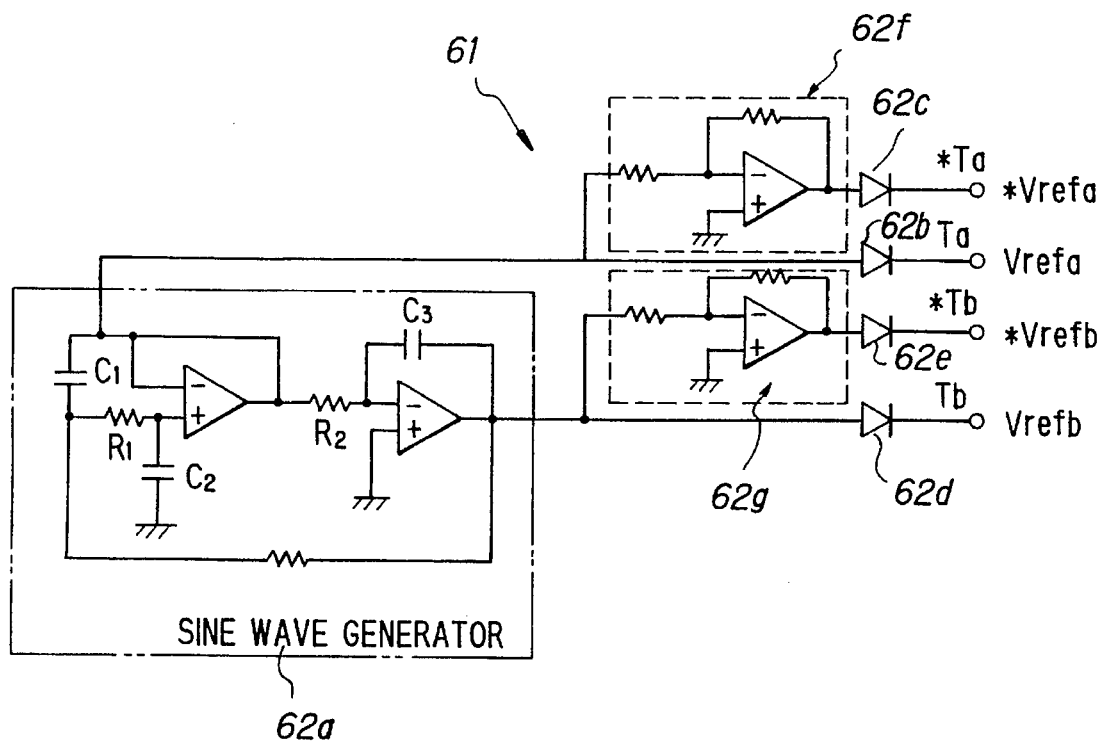
FIG. 7 shows the structure of a reference current waveform generator in the present invention.

The reference current generator 61 is provided with a sine wave generator 62a, diodes 62b to 62e which limit the negative peak, and inverters 62f and 62g, as shown in FIG. 7, and generates the reference current waveforms Vrefa, *Vrefa, Vrefb, *Vrefb in the respective phases from the output terminals Ta to Tb of the corresponding diodes 62b to 62e.

The operation of the excitation circuit 51A shown in FIG. 5 will now be explained.

When Vda=Vrefa, the output Sd of the one-shot circuit 51i is "0", and an exciting current $I_A$ does not flow on the coil 31a in the phase A. In this state, the reference current waveform Vrefa in the phase A starts to increase gradually, and when Vrefa becomes more than Vda, the output Sd of the one-shot circuit 51i becomes "1", and the switching transistor 51a is turned on, so that the exciting current $I_A$ begins to flow on the coil 31a in the phase A. When the exciting current $I_A$ further increases, the voltage Vda which corresponds to the exciting current value is generated and input to the comparator 51h. The comparator 51h compares the reference current waveform Vrefa with the detected voltage Vda, and when Vda becomes not less than Vrefa, the comparator 51h generates a pulse Sc. When the pulse Sc is generated, the one-shot multivibrator 51i outputs the signal Sd at a low level for a predetermined time Tm. As a result, the switching transistor 51a is turned off, and the exciting current $I_A$ becomes zero. When the switching transistor 51a is turned off, the energy stored in the coil 31a in the phase A flows in the diode 51e in the form of a flyback current $I_{FA}$.

Figure 8:
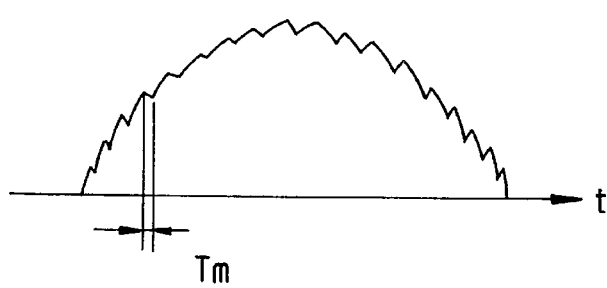
FIG. 8 shows the waveform of an exciting current in the present invention.
Figure 11:
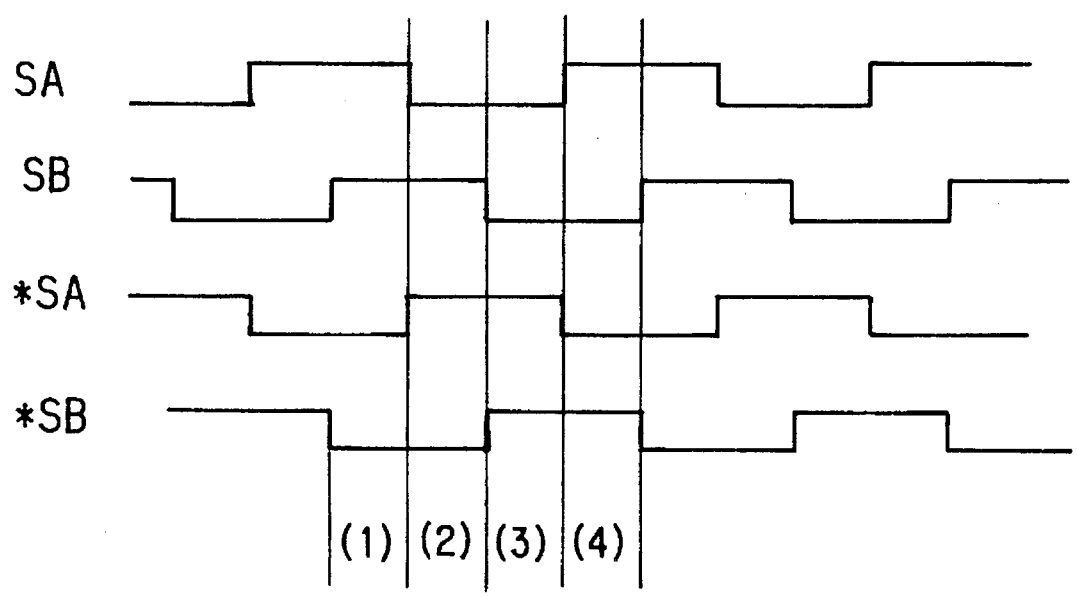
FIG. 11 shows the waveform of each phase driving signal.
Figure 12:
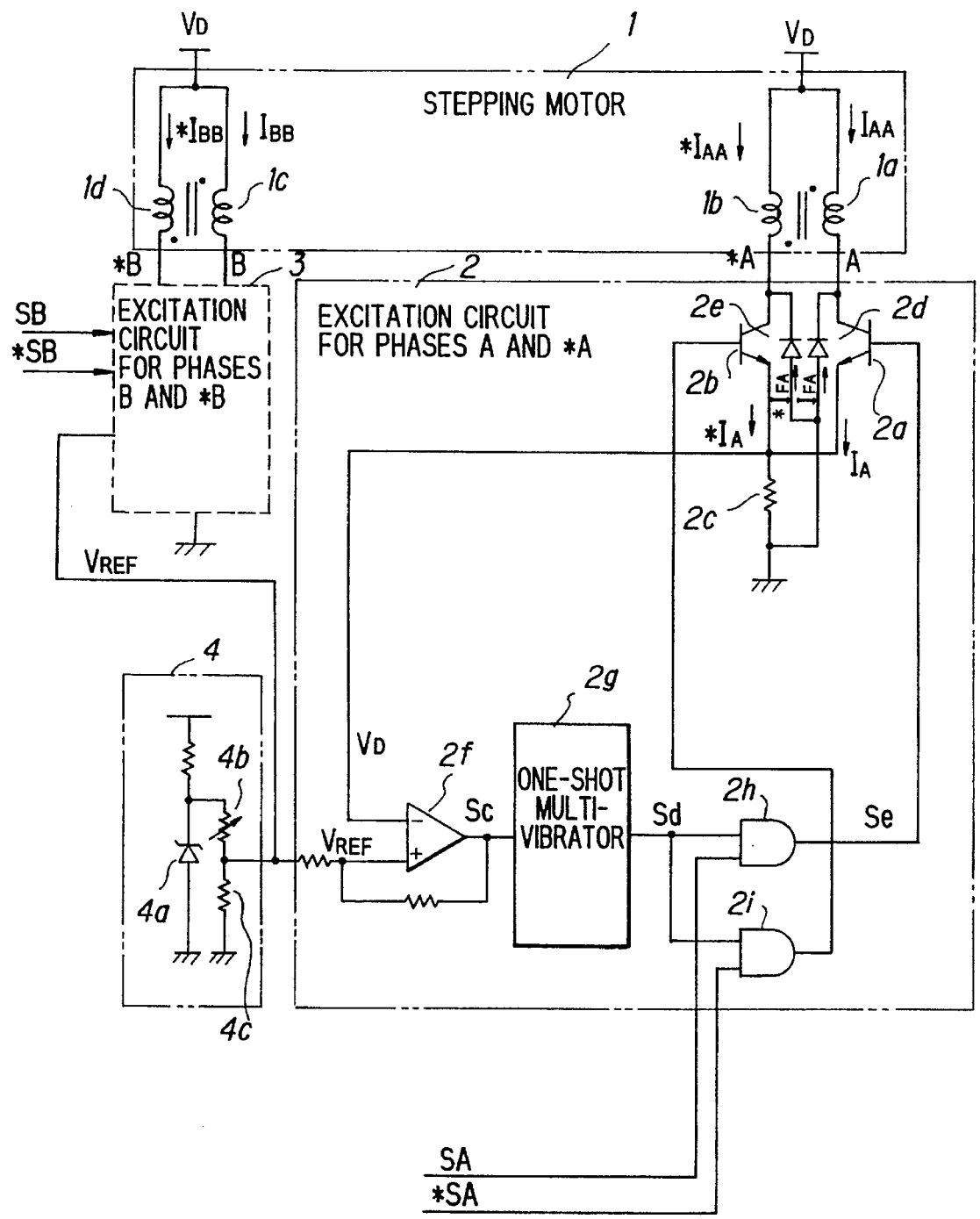
FIG. 12 shows the structure of a conventional excitation circuit.
Figure 13:
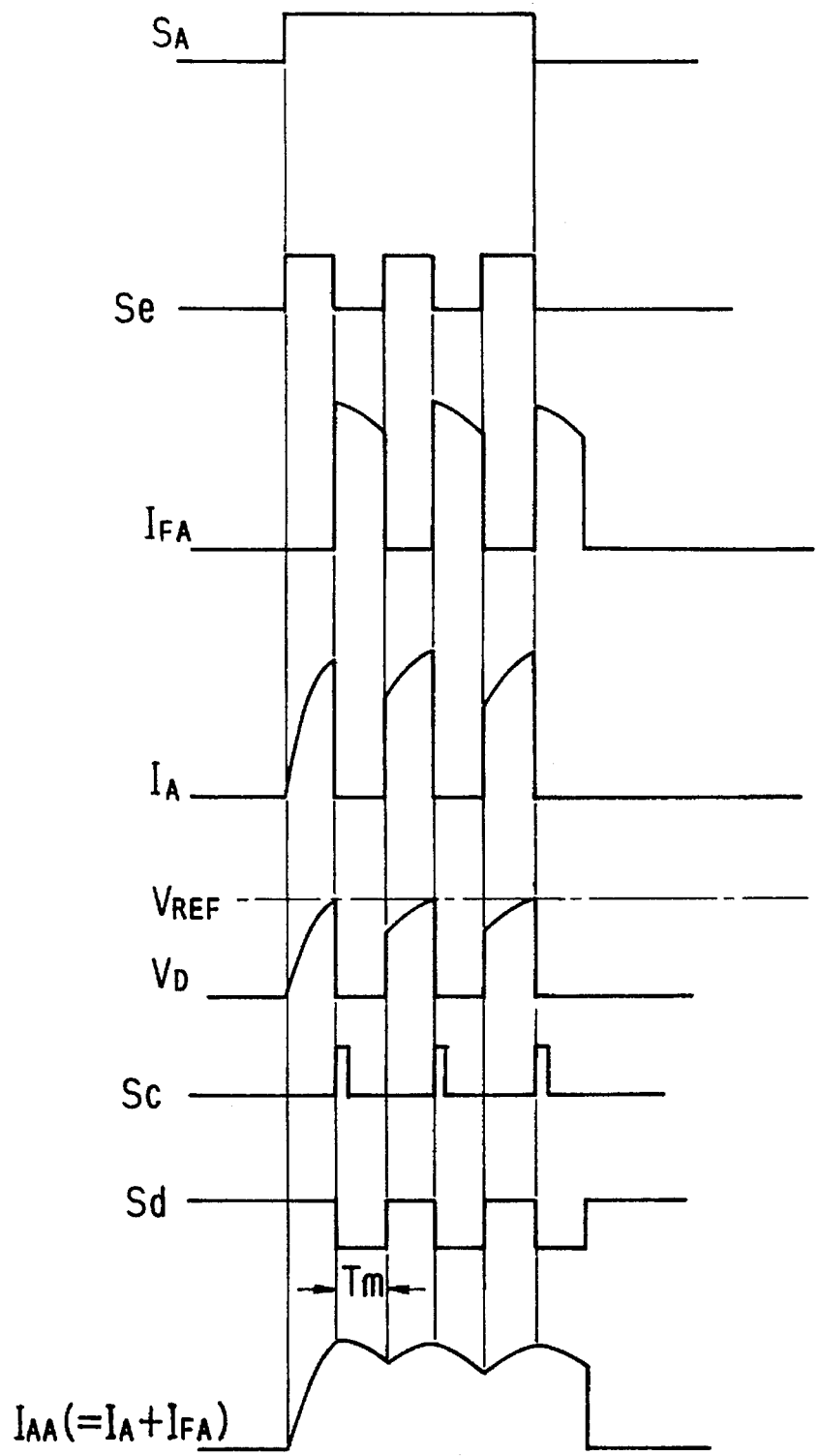
FIG. 13 shows the waveform of a signal at each portion of the conventional excitation circuit shown in FIG. 12.

After the predetermined time Tm elapses, the output signal Sd of the one-shot multivibrator 51i is raised to a high level again, so that the switching transistor 51a is turned on and the exciting current $I_A$ begins to flow again. This operation is repeated while the reference current waveform Vrefa is not less than 0 volt, and the current flows on the coil 31a in the phase A in such a manner as to gradually increase and thereafter gradually decrease. For example, if the reference current waveform Vrefa is a sine waveform, the exciting current having a sine waveform flows on the coil 31a in the phase A, as shown in FIG. 8, and if the reference current waveform Vrefa is a triangular waveform, the exciting current having a triangular waveform flows on the coil 31a in the phase A.

In the above explanation, the exciting current in the coil in the phase A is controlled. The exciting currents in the coils in the phases *A, B and *B are similarly controlled so as to flow in the form of exciting currents having a sine or triangular waveform. As a result, if it is assumed that each switching transistor is turned on/off n times for a period of T, which is the ½ period of the reference current waveform, the motor which is conventionally rotated at angular steps of 90 degrees (see FIG. 9A) is rotated at angular steps of (90/n) degrees (see FIG. 9B) in the present invention. That is, the stepping motor of the present invention is rotated smoothly. As a result, when the photosensitive drum is rotated by the stepping motor which is driven in micro angular steps in accordance with the present invention, there is no deleterious influence on an image. Since it is possible to use a stepping motor, it is possible to reduce the size and the cost of the image forming apparatus, and to prolong the life of the image forming apparatus. Especially, in color printers, which require a multiplicity of motors, if a stepping motor is used for each motor, the size and cost reducing effect is enhanced.

In this embodiment, a color printer is cited as an example, but the present invention is not restricted to a color printer but it is applicable to a monochromatic printer.

(f) Another structure of a color printer

FIG. 10 shows another structure of a color printer, which uses an intermediate transfer medium. In FIG. 10, the reference numeral 100 represents recording paper, 101 a photosensitive drum, 102 an electrifier, 103 a laser optical unit, 104 a transfer electrifier (first transferring portion), 105 a transfer belt (endless carrier) as an intermediate transfer medium, 106 a cleaner portion, 107 a second transfer portion for transferring a color toner image on the transfer belt 105 to the recording paper (cut paper) 100, 108 a fixing device, 109 a cleaner, 110 a developing portion, and 115 a paper-feeding belt. The developing portion 110 is provided with four sets of developing units 111, 112, 113, 114 for recording yellow, magenta, cyan, which are three primary colors, and black. The photosensitive drum 101 and the transfer belt 105 are smoothly rotated by a stepping motor (not shown) which is driven in micro angular steps.

In order to record an image, the surface of the photosensitive drum 101 is first uniformly electrified to a negative voltage by the electrifier 102. The surface of the photosensitive drum 101 is then exposed by the laser optical unit 103 so as to form an electrostatic latent image on the surface of the photosensitive drum 101. The photosensitive drum 101 is rotated in the direction indicated by the arrow, and the developing portion 110 develops the electrostatic latent image by a predetermined color toner. The electrostatic latent image is first developed by using a yellow toner. The first transferring portion 104 transfers the yellow toner image on the photosensitive drum 101 to the transfer belt (intermediate transfer medium) 105. Thereafter, the cleaner portion 106 cleans the photosensitive drum 101 so as to remove the remaining toner in preparation for the next image forming process.

In the next image forming process, a magenta toner is used as a developing toner. A magenta toner image is positioned (overlapped) at the yellow toner image on the transfer belt 105 and transferred. A cyan toner image and a black toner image are sequentially overlapped on the transfer belt 105 in the same way.

When the toner images of the four colors are overlapped, the second transfer portion 107 transfers the colored toner image collectively to the recording paper 100. The fixing device 108 then heats the recording paper 100 so as to melt the toners and fix the toner image to the recording paper 100. After the transfer of the toner image to the recording paper 100, the remaining toner is removed from the transfer belt 105 by the cleaner 109, and the transfer belt 105 is used for the next recording. This operation is repeated and a full color image is recorded on the recording paper 100.

Stepping motors each of which is driven in micro angular steps are usable for driving the photosensitive drum and the transfer belt in this color printer, so that the size and cost reducing effect is enhanced.

As described above, according to the present invention, since a photosensitive drum and a paper-feeding belt are driven by stepping motors each of which is driven in micro angular steps, it is possible to provide a small-sized inexpensive highly accurate image forming apparatus.

According to the present invention, it is possible to use a stepping motor for each motor in the colored image forming apparatus which requires motors for rotating a multiplicity of photosensitive drums, and to enhance the size and cost reducing effect.

In addition, according to the present invention, it is advantageously possible to rotate a stepping motor smoothly in a simple structure by using a sine or triangular exciting current waveform.

As many apparently widely different embodiments of the present invention can be made without departing from the spirit and scope thereof, it is to be understood that the invention is not limited to the specific embodiment thereof except as defined in the appended claims.

What is claimed is:

1. An image forming apparatus for developing an elastrostatic latent image formed on a photosensitive drum by a toner while rotating said photosensitive drum, transferring said toner image to a paper, and fixing said toner image on said paper, said image forming apparatus comprising:

a stepping motor, having a coil and phases for exciting the coil, for rotating the photosensitive drum; and an excitation circuit for gradually increasing an exciting current of the coil in each phase of said stepping motor to a predetermined value and thereafter gradually decreasing said excited current, said excitation circuit including switching elements, having ON and OFF states, each of the switching elements respectively provided for one of the phases of the coil;

a detecting portion for detecting the exciting current of the coil when said switching element is in the ON state;

a reference current generating portion for generating a reference current gradually increasing to a predetermined value and thereafter gradually decreasing in accordance with a reference current waveform in each phase;

chopping means for turning OFF one of said switching elements corresponding to the phase having a detected current value reaching the reference current; and a diode which causes a flyback current to flow on the coil while the one of the switching elements is in the OFF state.

2. An image forming apparatus according to claim 1, wherein the reference current waveform is one selected from a sine waveform and a triangular waveform.

* * * * *